June 20, 1967 J. A. DREYFUS ETAL 3,326,024
FRONTAL TYPE LOCK
Filed July 30, 1964 6 Sheets-Sheet 1

INVENTORS
JEAN ALBERT DREYFUS
HENRI CHARLES EDOUARD LATOUR
BY
ATTORNEY

June 20, 1967  J. A. DREYFUS ETAL  3,326,024
FRONTAL TYPE LOCK

Filed July 30, 1964  6 Sheets-Sheet 2

INVENTORS
JEAN ALBERT DREYFUS &
HENRI CHARLES EDOUARD LATOUR
BY

June 20, 1967  J. A. DREYFUS ETAL  3,326,024
FRONTAL TYPE LOCK

Filed July 30, 1964  6 Sheets-Sheet 3

INVENTORS
Jean Albert Dreyfus &
Henri Charles Edward Lateur
BY

June 20, 1967  J. A. DREYFUS ETAL  3,326,024
FRONTAL TYPE LOCK
Filed July 30, 1964  6 Sheets-Sheet 4

INVENTORS
JEAN Albert Dreyfus &
Henri Charles Edouard Latour
BY
Attorney

INVENTORS
Jean Albert Dreyfus &
Henri Charles Edouard Lalance
BY

June 20, 1967 J. A. DREYFUS ETAL 3,326,024
FRONTAL TYPE LOCK
Filed July 30, 1964 6 Sheets-Sheet 6

INVENTORS
Jean Albert Dreyfus &
Henri Charles Edouard Latour
BY

United States Patent Office 3,326,024
Patented June 20, 1967

3,326,024
FRONTAL TYPE LOCK
Jean Albert Dreyfus, 5 Ave. de la Grenade, Geneva, Switzerland, and Henri Charles Edouard Latour, Geneva, Switzerland; said Latour assignor to said Dreyfus
Filed July 30, 1964, Ser. No. 386,255
Claims priority, application Switzerland, Aug. 2, 1963, 9,581/63; July 17, 1964, 9,624/64
14 Claims. (Cl. 70—351)

The present invention relates to an improved frontal type lock by means of which individual locking elements are simultaneously and parallely displaced and arranged against individual counter springs by means of a key insertable frontally into the lock, such that a collective locking element is actuatable by means of a collective counter spring.

Frontal type locks are already known to the art in which individual locking elements provided in a predetermined number D with different lengths or levels N are actuatable by keys. By appropriate selection of the number D and the levels N there is provided a very larger combination possibility for the individual locks. In copending United States patent application, Ser. No. 156,594, filed Dec. 4, 1961 and entitled "Lock and Key," now United States Patent 3,204,437 is disclosed a number of embodiments of such frontal type locks.

If each individual locking element and each corresponding key element exhibits N possible displacement levels then the maximum number of combination of locks and keys is given by the equation $C=N^D$. Assuming, for example, that $D=6$ locking elements and $N=4$ levels, then the maximum number of combinations of locks or keys equals $C=4^6$ or 4.096 combinations.

It will be appreciated that in the context of this application the direction of the parallel and simultaneous displacement of the so-called elementary locking elements can be conveniently designated herein as "frontal direction."

With heretofore known locks the contact points or locations of the individual locking elements coming into contact with the key are arranged considerably behind the frontal plate of the lock, so that a key hole appears into which the key may be inserted. A disadvantage of this type of physical structure is that dirt and moisture can penetrate into such key hole, whereby faultless operation of such lock during the course of time is no longer guaranteed.

Accordingly, it is a primary object of the present invention to provide an improved lock in which the manufacture and construction of the individual structural elements is simplified, as for example the individual locking elements, and the supervision which was heretofore necessary for a complicated combination lock is eliminated.

Generally speaking, the present invention is characterized by the features that the individual locking elements consist of lamellae or plates arranged in a pack or package lying flush with the front plate, whereby the surface of the lamellae exhibit projections which extend into the key hole of the front plate. Due to this construction there is obtained the following advantages:

(a) The key hole can no longer become soiled since it is itself closed by the lamellae.
(b) There is provided an inexpensive construction since the lamellae can be punched or stamped, and the front plate only requires a single slot which itself is closed by the projections of the lamellae arranged in package form.
(c) Miniaturization or reduction in size of the slot of the locks since the lamellae can be very thin and compactly bear against one another.
(d) Miniaturization of the key since its contact points compactly lie against one another without gaps in accordance with the thickness of the lamellae. The key no longer requires any stem upon which the key bits are arranged. As a result the key can consist of a support member upon which the key bits can be directly arranged which are necessary for actuating the individual locking elements.
(e) There are available a large number of combination possibilities since it is possible to combine many lamellae into a package and the dimensions can nonetheless remain reduced to a minimum.
(f) There is greater security since the projections of the lamellae can be very long, whereby the lock can be arranged behind a thick metal plate. The key remains equally small.

Furthermore, during utilization of the lock the following improvements can be optionally added:

(1) Automatic return mechanism so that a small, purely frontal force is required of the key for actuating the lock.
(2) Force limiting mechanism which prevents that there is exerted an optionally large force upon the collective locking element, and whereby probing as well as forcing of the lock is rendered more difficult.
(3) Trick notching or indentation can be provided at the lamellae so that attempts to probe the lock are led astray.
(4) The key can be imbedded in the slot of a finger ring and removable such that it is accommodatable to diverse finger configurations.

Insofar as the key itself is concerned, it will be appreciated that such can consist of a very tiny plate which is no larger than the head of a match, although it permits of a million combination possibilities.

Other features, objects and advantages of the invention will become apparent by reference to the following detailed description and drawings in which.

Figures 1, 2, 19:
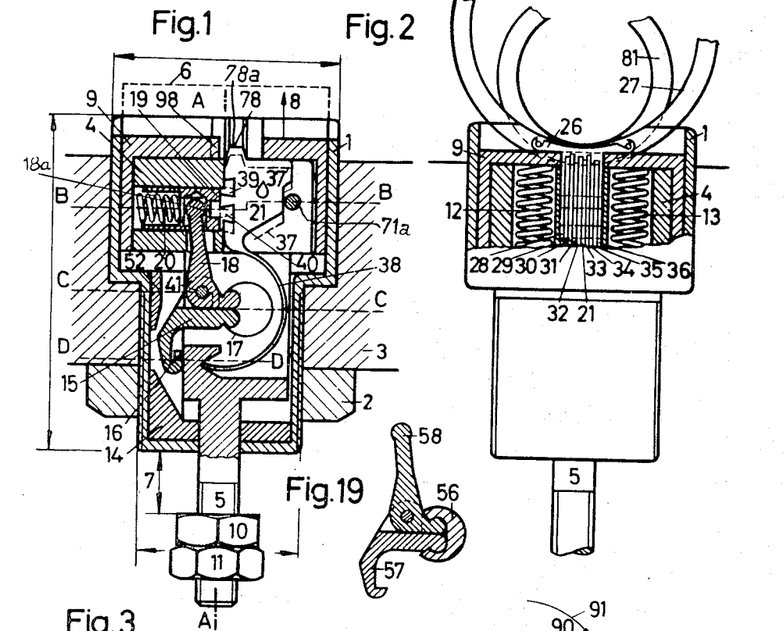
FIGURE 1 is a longitudinal sectional view taken through a frontal push-button type lock, wherein the key is only necessary for opening but not for closing the lock.
FIGURE 2 is a fragmentary, cross-sectional view of the lock of FIGURE 1, taken along lines A—A thereof, and illustrating a portion of the corresponding key.
FIGURE 19 illustrates a variant of the lever system of FIGURE 1, whereby the key is not only necessary for opening the lock, rather also for closing the lock of FIGURE 1.

Describing now the drawings and with attention particularly directed to the embodiment of FIGURE 1, it will be seen that a lock housing 1 is secured by means of a nut 2 or equivalent fastening expedient to a door 3. A pressure cylinder 4 is rigidly connected with a rod 5 usable as a locking bolt and which is shown in closed position. The dotted lines 6 and the arrows 7 and 8 depict the manner and direction of displacement of a cylinder cap 9 providing a front plate for the lock as well as the bolt 5 during opening of the lock. The nut 10 and the counternut 11 permit limiting the path of the bolt 5. It can be assumed that the bolt 5 is capable of locking or freeing, for instance a non-illustrated handle of the door 3, or it can be centrally installed in a rotating hand grip.

Figure 16:
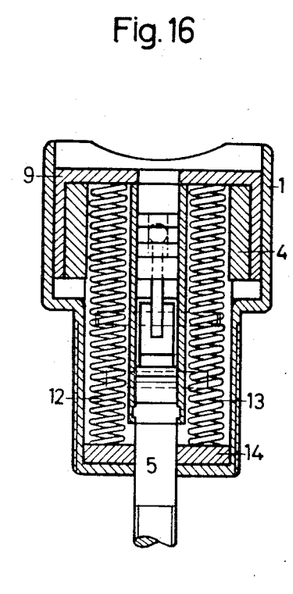
FIGURE 16 is a cross-sectional view of the lock of FIGURE 1, taken along lines E—E of FIGURE 13.

In the closed position of the lock, as illustrated in FIGURE 1, the pressure cylinder 4 housed within the front plate or cap 9 is held back against the force of the compressed springs 12 and 13 (FIGURES 2 and 16) which bear against the base member 14 and tend to force the front plate 9 into the position shown at 6 upon opening of the lock by a pawl 15. This pawl 15 engages or hooks onto a stationary crosstie or cross-beam 16 and is held by a circular spring 17 and the lever means 18. An end 18a of the lever means 18 is seated in a collective locking element 19 which is subjected to the pressure of a compressed spring 20 providing a collective counter spring and which, however, pushes against the lamellae 21 and 28 to 36 (FIGURES 2 and 3), or lamellae 22 to 25 (FIGURES 4 to 7) which function as individual or elementary locking elements.

The displacement levels such as $N_0$, $N_1$, $N_2$, $N_3$ (FIGURES 4 to 7) permits selecting the opening combination which corresponds to a key 26 embedded in a ring 27 (FIGURE 2). Thus, if for example, there is available $D=10$ lamellae such as lamellae 21 and 28 to 36, each with $N=4$ possible levels, then the maximum number of combinations $C=4^{10}=1,048,576$, resulting in approximately a million usable locks and keys, respectively.

In this case, the key 26 must displace the lamellae 21 through two level units against the action of the individual counter spring 38 and into the dotted line position 37, in order that the collective locking element 19 can penetrate into the notches or grooves 39 and 40 of this lamellae 21. As soon as all the grooves 39, 40 of the lamellae 21 and 28 to 36 are properly positioned by the correct key, then the so-called collective locking element 19, under the pressure of the collective counter spring 20, penetrates into the lamellae. This collective locking element 19 then displaces the lever means 18 which rotates about the shaft 41 as well as the pawl 15 which disengages from the crossbeam or crosstie rod 16.

As a result, the pressure cylinder 4 moves together with its front plate or cap 9 and its bolt 5 according to the arrows 7 and 8, and under the pressure of the springs 12 and 13. This cap 9 then assumes the position shown in dotted lines, at 6, and the lock is opened. During this operation the pawl 15 is pushed back by the cam plate 52 which functions as a force direction changing member, and the lever 18 pulls the collective locking element 19 out of the grooves 39, 40 of the lamellae and again stresses the collective counter spring 20. At the same time, the individual counter springs, such as spring 38, push the associated lamellae 21 and 28 to 36 back into their original or rest position, and the secret of the frontal type combination lock is again restored. It is assumed that the key 26 moves back or is retracted after it has executed a short frontal pressure.

Figures 4, 5, 6, 7, 8, 9, 10, 11, 12, 18:
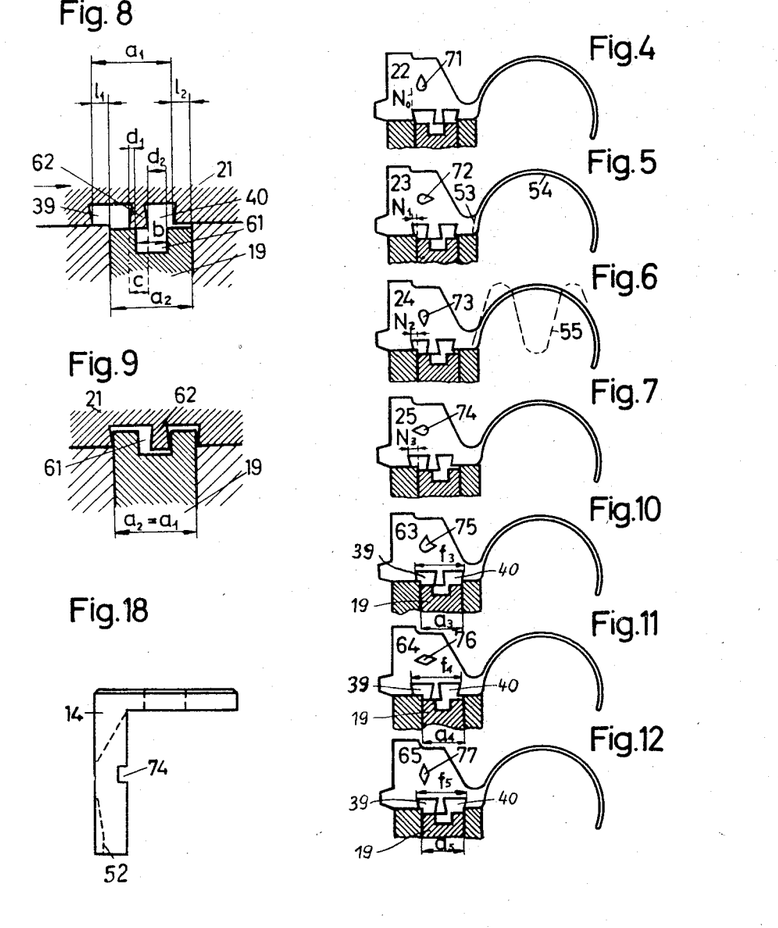
FIGURES 4 to 7 are respective views of elementary locking elements in the form of lamellae for four different displacement levels and usable in the lock depicted in FIGURE 1.
FIGURES 8 and 9 are enlarged, fragmentary sectional views illustrating the function of a trick tooth provided for the lock of FIGURE 1.
FIGURES 10 to 12 illustrate three locking elements in the form of lamellae having doubled displacement levels for pass keys.
FIGURE 18 is a perspective view of a base member of the lock according to FIGURE 1, illustrated in a position turned through 180° out of the plane of the drawing from its normal position of use in the lock of FIGURE 1.
Figure 13:
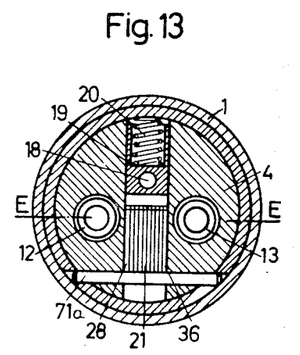
FIGURE 13 is a cross-sectional views of the lock of FIGURE 1, taken along lines B—B thereof.
Figure 14:
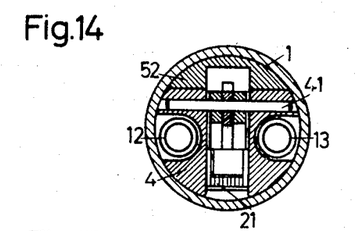
FIGURE 14 is a cross-sectional view of the lock of FIGURE 1, taken along lines C—C thereof.
Figure 15:
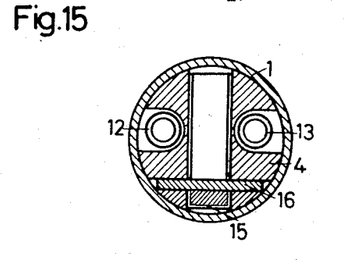
FIGURE 15 is a cross-sectional view of the lock of FIGURE 1, taken along lines D—D thereof.

The elementary or individual counter springs 38 can be arch-shaped, as shown in FIGURE 1, or serpentine as shown in phantom lines, at 55, in FIGURE 6. They can be formed of one piece together with the associated lamellae, whereby they are simultaneously stamped or punched with such lamellae for example from beryllium-bronze or steel. These counter springs 38 can also be soldered or otherwise fastened to the associated lamellae or form a sort of comb-like structure.

In order to again close the lock it is sufficient to press back the front plate or cap 9, located in the dotted position indicated by reference numeral 6, by means of the tips of the finger. The pawl 15 thereby engages underneath the crosstie or traverse 16, since the circular-shaped spring 17 permits such, and the springs 12, 13 are again stressed or biased.

As a variant construction according to FIGURE 19, the spring 17 of FIGURE 1 can be replaced by a rigid C-clamp 56, whereby the pawl or hook 57 can no longer deviate. In this case, it is not possible to again lock the lock without a key. Thus, with the aid of a changeable coupling it is possible to achieve selective locking of the lock with or without a key.

FIGURES 8 and 9 depict fragmentary, enlarged views of the individual or elementary locking element in the form of lamella 21, as well as the collective locking element 19 in closed and open position respectively, for the purpose of explaining the provided trick means which render more difficult probing of the lock.

It will be seen that the external spacing $a_1$ between the grooves 39 and 40 of the lamella 21 is equal to the width $a_2$ of the collective locking element 19. Hence, as soon as the correct key has displaced the lamella 21 such that the portion $a_1$ is situated exactly opposite the portion $a_2$, then the collective locking element 19 penetrates into the lamella 21. However, element 19 possesses a groove 61 of constant width $b$ and the lamella 21 possesses a tooth 62 which can protrude somewhat from the edge of this lamella and has a changeable width $c$ which is smaller than the aforesaid dimension $b$. In the closed position shown in FIGURE 8, the dimension $d_1$ is smaller than $l_1=l_2$ and $d_2$ is larger than $l_1=l_2$. Now, if a person attempts to probe the lock in order to determine its combination or secret, the lamella 21 is displaced with a pin for example. If $d_1$ becomes equal to zero he then has the illusion that he has found an actual opening-level of an elementary locking element while it is an illusory level however.

Whereas the groove 61 exhibits a constant width $b$ the tooth 62 can possess variable width $c$ from one lock group to the other, or from one lamella to the other, whereby discovery of the apparent or illusory level does not provide any information. It is also possible to provide a plurality of such trick grooves and teeth and/or to vary the number from one lamella to the next, whereby each systematic probing is rendered impossible.

In FIGURES 10 to 12 there are shown techniques applied to the lamellae rendering possible the formation of so-called "pass keys." The external distances $f_3$, $f_4$, $f_5$ of the lamellae grooves 39, 40 are larger by one or two level elements than the corresponding widths $a_3$, $a_4$, $a_5$ of the collective locking element 19. As a result, by way of example, the levels $N_1$ and $N_2$ unlock the lamella 63, the levels $N_1$, $N_2$, $N_3$ unlock the lamella 64, and the levels $N_0$, $N_1$, $N_2$ the lamella 65. Consequently, different keys, among them individual and pass keys, can open the same lock according to a given system.

In the situation where it is assumed $D=10$ lamellae and $N=4$ levels per lamella, there results $$C=4^{10}=1,048,576$$

lock and key combination which can be mathematically divided into the following groups of individual keys and pass keys, the product of which in each case results in the value C, as indicated by the following chart:

| Individual keys | $4^5$ 1,024 | $4^6$ 4,096 | $4^7$ 16,384 | $4^8$ 65,636 | $4^9$ 262,244 | $4^{10}$ 1,048,576 |
|---|---|---|---|---|---|---|
| Pass keys | $4^5$ 1,024 | $4^4$ 256 | $4^3$ 64 | $4^2$ 16 | $4^1$ 4 | $4^0$ 1 |

Figure 17:
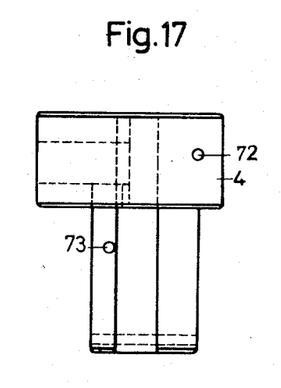
FIGURE 17 is a perspective view of the cylinder body of the lock according to FIGURE 1.
Figure 23:
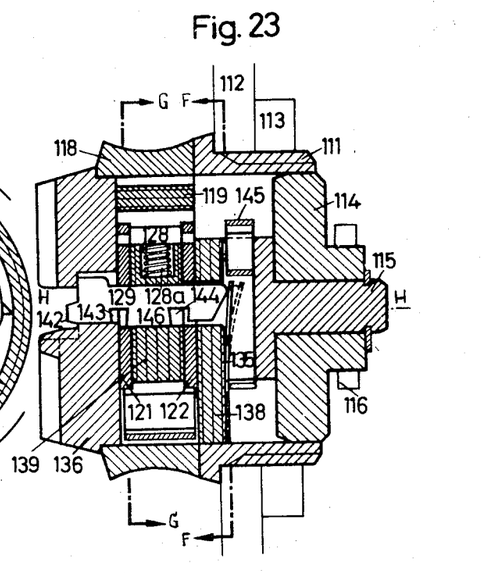
FIGURE 23 is a variant form of frontal type lock, illustrated in cross-section, and of the type provided with a rotary knob instead of a push-button type knob.
Figure 24:
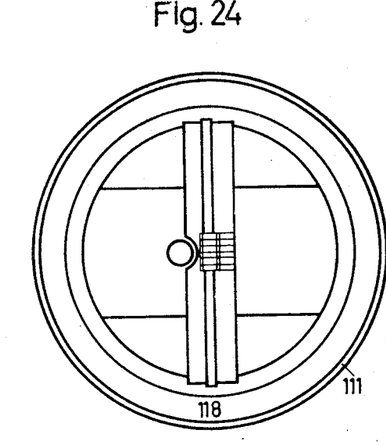
FIGURE 24 is a top view of the lock shown in FIGURE 23.

In order to be able to distinguish the different types of levels provided for the lamellae such can be provided with various punched markings, as indicated by reference numerals 71 to 77 in FIGURES 4 to 7 and 10 to 12. The pin 71a of FIGURE 1 serves for connecting as well as for guiding the lamellae 21 and 28 to 36. This pin 71a is connected in a hole or bore 72 of the pressure cylinder 4 (FIGURE 17). A hole 73 permits throughpassage of the shaft 41 for the lever 18 and the pawl 15. In FIGURE 18 there is illustrated the base piece 14 for the lock of FIGURE 1, the groove 74 serving for securing the crosstie bar or rod 16.

Figures 3, 20, 21, 22:
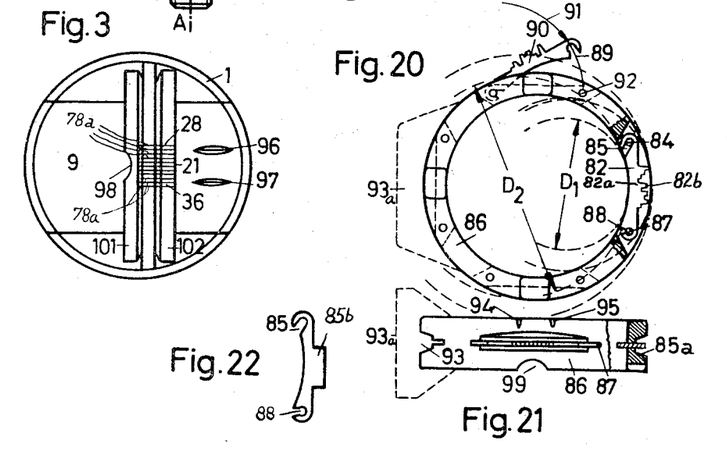
FIGURE 3 is a top view of the lock depicted in FIGURE 1.
FIGURE 20 is a fragmentary, cross-sectional view of a ring which can be worn on the finger of a user and which incorporates four removable keys.
FIGURE 21 is a side-view, partially in section, of the ring shown in FIGURE 20.
FIGURE 22 shows the basic material for a key prior to cutting-in the teeth.

The lamellae, such as lamella 21, serving as elementary locking member is punched from a hard metal sheet such as beryllium-bronze for instance. As shown in FIGURE 1, it possesses a projection 78 which extends or is imbedded in the front plate or cap 9 of the lock. This projection 78 carries a contact edge 78a adapted to be pressed by the corresponding contact point of the key 26. Such projection 78 can be constructed to be very long in the event the lock should remain protected behind a thick metal plate. The projection 78 replaces the previous conventional key stem. In other words, instead of the key penetrating into a longer hole in the slot, the lock possesses lamellae projections 78 which close the key hole and are directed towards the key. In FIGURE 3 such closure appears as a gapless pack of contact edges 78a.

The key which can be used in conjunction with this lock exhibits small external dimensions, as such was not previously possible. In consequence of these small dimensions it is possible that a larger number of the most different keys can be combined into a single structure, likewise possessing small dimensions. For example, the body member 82a in the form of plates and providing the keys can be arranged upon a circular-shaped structure. They are, for instance, imbedded in the outer surface of a finger ring, whereby the surface of these plates 82a with their teeth are directed outwardly. It is also conceivable that such plates are accommodated in a small housing. The plates, which are subjected to spring pressure, can for example be pushed out of the housing after actuating a push button for instance, so that the desired key is readily accessible. The small housing can be carried in the pocket of the user, thereby replacing a large key chain, as such was usual heretofore. Furthermore, the plates providing the keys can be imbedded upon objects which are used daily, such as for instance wrist watches, arm bands, cuff links, articles of jewelry, lipstick cases, powder cases, etc.

According to FIGURES 20 and 21, the key 82 having a toothed surface 82b is provided with an inclined slot 85 which is suspended in a rivet or pin 84 of the ring 86. This pin 84 traverses the slot 85 provided at the ring 86. Thereafter, the hook or clip portion 88 of the key 82 is pressed onto the pin or rivet 87 and such key is then temporarily and completely located in the ring 86. With the aid of the tip of a pin or the like inserted into the small hole 87 it is easy to again pull out the hook-side 89 of the key, such as key 90 best shown in FIGURE 20. The arrow 91 denotes the direction necessary for pushing the key 90 in order that its clip or hook 89 engages with the rivet 92. In this manner, it is readily possible to interexchange the most variant keys.

The ring 86 can possess diameters which, for example, vary between $D_1=12$ millimeters and $D_2=24$ millimeters, in order to accommodate itself to every finger size. It can exhibit four slots such as 85a and 93, whereby it is possible to imbed up to four keys, such as 82 and 90. The active portion of such a frontal key resembles a toothed cutting-edge, generally indicated by reference character 82b. This could be disturbing for a person wearing such upon a finger ring if it did not completely disappear into a ring slot 85a, 93. One of the sides of the ring can be reserved for a jewel, or for an emblem, as generally indicated by the phantom lines bearing reference numeral 93a. It is then sufficient to rotate the ring 86 about the finger in order that the desired key moves into the frontal position. In order to be able to also distinguish different keys in the dark it is possible to provide one to four recesses, such as recesses 94, 95 which can be felt by the nail of the user. They correspond to other recesses or notches, such as 96, 97 which are engraved in the front cap 9 of the lock (see FIGURE 3).

In order to positively determine that the keys 82, 90 (FIGURE 20) arranged upon the finger ring 86 are always pressed in the correct position against the front cap 9 (FIGURE 3) a nose 98 is eccentrically arranged at the front cap 9 and which penetrates into a lateral depression 99 of the ring 86. The guiding of the ring 86 in the front cap 9 takes place by means of a slot having a circular-shaped base, the sides of which are indicated by the lines 101 and 102 of FIGURE 3. The radius of curvature of this base is larger than the largest radius $D_2/2$ of the relevant finger ring. The lateral contact surface of the key 26 (FIGURE 2) forming the zero level or reference level $N_0$, bears directly upon the outer face of the front cap 9, this means upon the front surface of the lock.

It is optionally possible to provide retaining or withholding mechanism for the key in the slot of the front cap 9, for example elastically with springs or spheres. The teeth of the key 82 (FIGURE 20) can be manufactured by punching or cutting the raw material 85*b* of FIGURE 22. It is possible to construct an apparatus with, for example, ten punches and four respective possible levels by means of which it is possible to quickly and inexpensively copy each key, insofar as the original or the code number is exhibited by an authorized person.

The noses, such as 98, in the front cap 9 of FIGURE 3, as well as the depressions or recesses, such as 99, in the ring 86 of FIGURE 21, can possess different contours, such as round or square for instance, in order to be able to differentiate groups of locks and keys which should not be confused. It will be appreciated that the noses 98 and depressions 99 can be reversed in their position at their associated member. Also, different colors can be used for different keys.

In the embodiment of lock depicted in FIGURES 23 to 30 it will be seen that the frontal lock having a rotary knob instead of a push button knob construction, consists of a housing 111 which can be secured in a door 112 by means of a nut 113. A rotary disk 114 is mounted upon a pin or shaft 115 and guides a bolt or lock mechanism 116 therewith, which can also be an eccentric or a gear in the event it is desired to transform the rotary movement into a bolt displacement. The rotary disk 114 is entrainably guided by the rotary knob 118, the coupling nose 117 of clamping spring 124, the cam disk 119 and the entrainment bolts 120.

Figure 26:
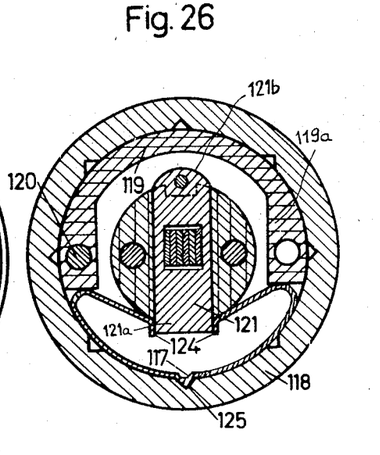
FIGURE 26 is a cross-sectional view of the lock shown in FIGURE 23, taken along lines G—G thereof.

However, in the closed position of the lock depicted in FIGURE 26, the collective locking element 121*a* bears against the clamping spring 124 which prevents a rotation by the manually rotatable knob 118. If it is attempted to force the lock then the coupling nose 117 glides out of its groove 125 as well as also past the further grooves 126, 127 with a ratcheting action, in order to protect the lock from damage.

Figure 25:
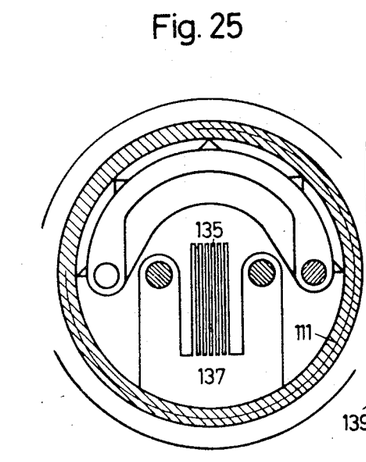
FIGURE 25 is a cross-sectional view of the lock of FIGURE 23, taken along lines F—F thereof.

The collective locking element 121*a* consists of two plates 121 and 122 connected with one another by means of a pin. The collective counter spring 128*a*, shown compressed in FIGURE 23, strives to displace the collective locking element 121*a* from the position shown in FIGURE 26 into the position shown in FIGURE 27 or FIGURE 28. It is, however, prevented from doing so by a locking combination of the lamellae 129 to 134 which function as elementary or individual locking elements and which remain pressed against the front plate or cap 136 by means of the elementary or individual counter springs, such as springs 135. These counter springs 135 can be cut or punched in comb-like manner in the bronze- or steel sheet 137 (FIGURE 25). The shaft 115, support disk 138, guide hub or nave 139 and front cap 136 are held together by the bolts 140 and 141. The rotary disk 114 is held by a clip 142*a* upon the pin or shaft 115.

Now, in order to open the lock it is only necessary to press the correct key (not shown) against the projections, such as projection 142 of the individual locking elements, such as locking element 129. Then the lamella-type locking elements 129 are for example displaced in such a manner that the collective locking plates 121 and 122 penetrate into the grooves 143, 144 thereof under the action of the pressure of the collective counter spring 128*a* and assume the position shown in FIGURE 27. As a result, the rotatable structure consisting of rotary knob 118, clamping spring 124 and cam plate or disk 119 can rotate relative to the fixed structure comprising housing 111, support disk 138, shaft or pin 113, hub 139, front cap 136 as well as the locking elements 129–134.

Figure 27:
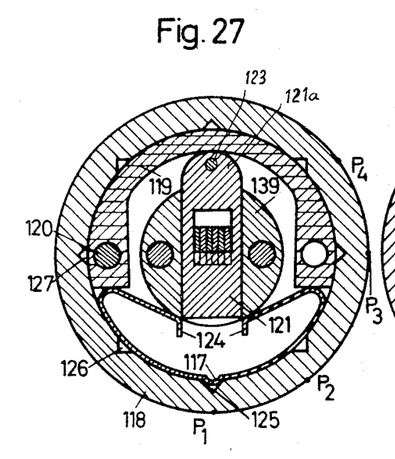
FIGURE 27 is a cross-sectional view, similar to FIGURE 26, however illustrating the freed collective locking element.
Figure 28:
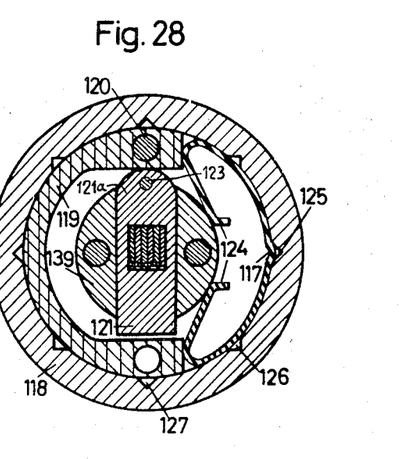
FIGURE 28 illustrates the same cross-sectional view as shown in FIGURES 26 and 27, however after the rotating knob has been rotated through an angle of approximately 90°.
Figure 29:
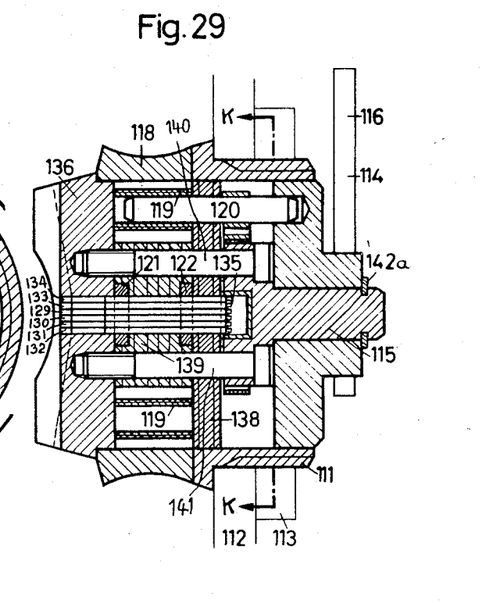
FIGURE 29 is a cross-sectional view of the lock of FIGURE 23, taken along the lines H—H thereof.
Figure 30:
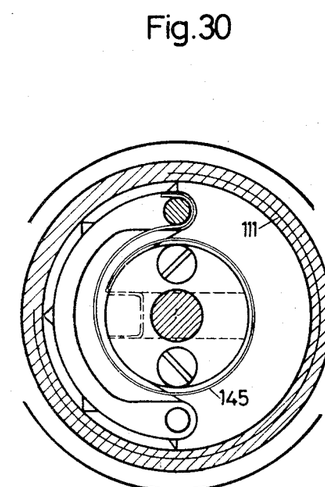
FIGURE 30 is a cross-sectional view taken along lines K—K of FIGURE 29.

When the cam disk 119 rotates from the position illustrated in FIGURE 27 into the position of FIGURE 28, the collective locking plate 121 must return against the action of the collective counter spring 128*a*, and as a result the individual lamellae 129 to 134 are freed. They are then pressed against the front plate 136 by means of the individual counter springs 135 and the secret of the lock is again restored. A spiral spring 145 can optionally ensure that the rotary movement necessary for opening the locking mechanism 116 automatically occurs as soon as the key is frontally pressed-in. Thus, the rotary knob 118 can either be rotated by hand or by the spiral spring 145 for opening the lock. However, in both cases for closing the lock the knob 118 must be manually rotated.

The lamellae, such as lamella 129, possess a trick tooth 146 which projects slightly past and between the grooves 143 and 144 and which render more difficult probing of the lock as already explained, perhaps even making such completely impossible. The width of the tooth 146 can be varied from one lock series to the next, in order that systematic recognition is not possible.

The front locks of the present invention having a pressure knob or rotary knob can be used for locking and releasing all possible bolts, hand grips and so forth. Such frontal type lock having a pressure or push-button type knob can, for example, be centrally installed in the normal handle of a door. It can also serve as the lock for the contact or ignition system of an automobile. For example, it can be centrally mounted in a rotary knob capable of assuming three positions, namely "contact-off," "contact-on," and "starter." If the rotary knob is located in the position "contact-off" such can be simply locked by pushing the frontal lock with the finger. Release takes place by means of a key which can be optionally worn on the finger, as previously explained.

Also, the frontal lock with rotary knob can be employed in automobiles or the like as a lock for the steering column and ignition, for example, with four positions $P_1$ to $P_4$ (FIGURE 27) wherein: $P_1$=switching-off main power supply, $P_2$=main power supply closed, steering released, $P_3$=main power supply and ignition switched-in, steering release, and $P_4$=starter, with the transition from $P_1$ to $P_2$ taking place automatically by means of a spring as soon as the key is pressed and also the transition from $P_4$ to $P_3$ as soon as the knob is released. In this case, the rotary knob 118 must be capable of turning through an angle of 135° instead of 90°, for which purpose the clamping spring 124 is constructed only on one side instead of on both sides, and the cam disk 119 must be appropriately elongated.

The secret of the lock is always automatically again restored as soon as rotation through more than 60° takes place, since the collective locking element 121*a* is again pushed back into its starting position by the cam plate or disk 119 as soon as the straight portion 119*a* of the cam disk 119 during rotation arrives at the upper rounded portion 121*b* of the collective locking element 121 and pushes such downwardly. It should be observed that with all embodiments of the described locks, a short pressure is required of the key in purely frontal direction. All further actuation, such as rotation, are directly executed manually without the key. Such is rendered possible by the inventive devices such as cam disk 119, the clamping spring 124, the collective spring 128*a* and so forth, which can generally be designated as "force direction changing members or devices."

Figures 31, 32, 33:
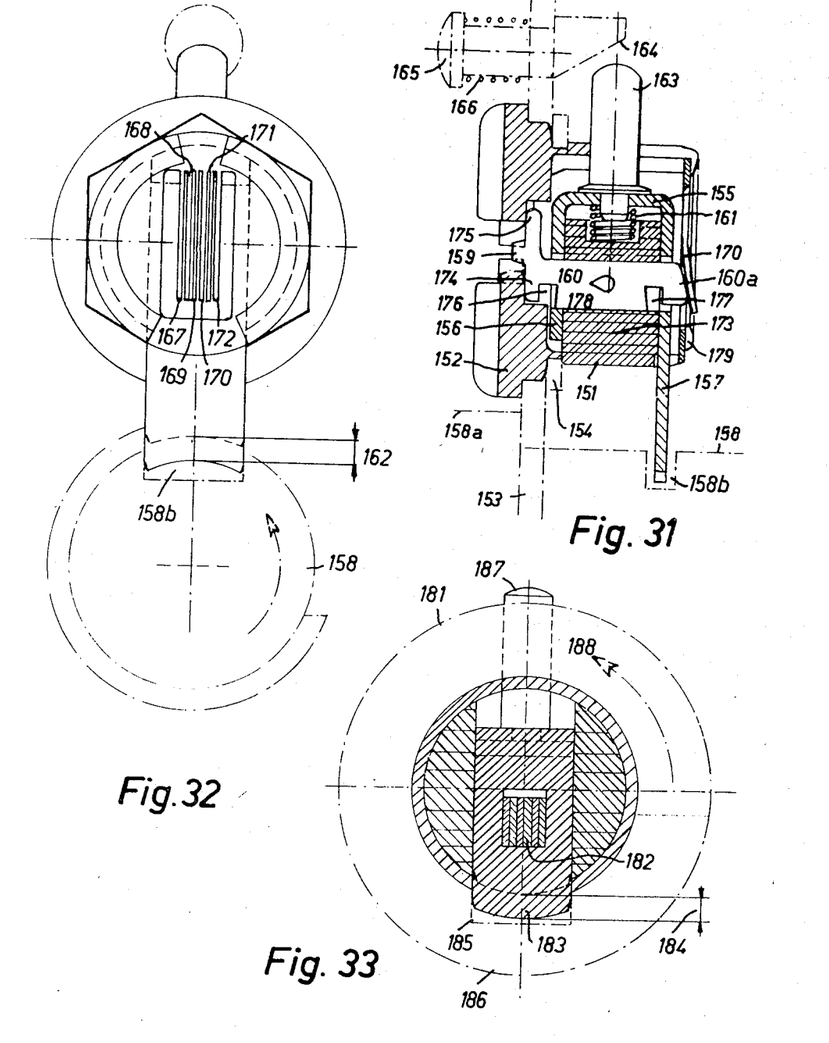
FIGURE 31 is a cross-sectional view taken through a further embodiment of inventive frontal type lock of simplified construction which can lock a lateral hand grip and which is lockable by means of a lateral auxiliary knob.
FIGURE 32 is a rear view of the lock depicted in FIGURE 31.
FIGURE 33 is a schematic cross-section of a variant of the lock according to FIGURE 31, and wherein a concentrically arranged ring can be locked.

The simplified embodiment of lock depicted in FIGURES 31 and 32 comprises a circular housing 151, the front plate or cap 152 of which can be hexagonal and is secured in a door 153 or otherwise by means of a clip 154. When the lock is closed the U-shaped collective locking element 155 prevents rotation of the hand-grip 158*a* shown in phantom lines, by means of its two legs 156 and 157 which are different in length.

If the correct key (not shown) is pressed against the projections 159 of the lamellae 160 functioning as individual locking elements, then the collective spring 161 pulls the leg 157 out of the groove 158*b* through the path 162, such groove being located at the shaft 158 of the hand grip 158*a*.

In order to again close the lock it is necessary to press against the auxiliary knob 163, either from the inside or from the outside, with the aid of an inclined face or cam 164 of a knob 165 arranged at an angle of 90° with respect to the auxiliary knob 163 and which is returned by the counter spring 166. The lamellae 160 are pressed against the front cap or plate 152 by means of the individual counter springs 167 to 172. These springs 167 to 172 form the teeth of a comb and can be cut from a bronze or steel sheet.

The collective locking element 155 slides along the guide block 173. Each lamella 160 possesses a projection 159 provided for contact with the key, an edge 174 bearing against the front cap 152, an edge 175 which bears against the leg 156 of the collective locking element 155, and grooves 176 and 177 into which can penetrate the collective locking legs 156 and 157, respectively, as soon as the correct key has arranged all of the lamellae 160 in the proper position for opening the lock, in the manner as previously explained.

A trick tooth 178 can be located between the grooves 176 and 177 in order to render more difficult probing of the lock and to protect the lock's secret. The lamellae 160 possess a steep rear edge 160a which bears against the individual counter springs 170. The locking system can be mounted in the housing 151, whereby for retaining it cosame the edges 179 are bent back, as best shown in FIGURE 31. The described lock can be particularly used to advantage with the doors of automobiles or other vehicles.

The variant form of lock shown in FIGURE 33 is similar to the previous embodiment, yet depicts the manner in which the lateral arranged hand knob 153 which is to be locked, can be replaced by a concentric ring 181 shown in chain-dot lines in this figure. The individual locking elements, such as lamellae 182, traverse the collective locking element leg 183 which engages along path 184 in the groove 185 of the ring 186 to be locked. In order to again close the lock once it has been opened, it is sufficient to laterally press back an extension 187 of the collective locking element 183. This extension 187 can also be actuated by a lever or equivalent structure from the front side of the lock.

With the aid of four ratcheted positions this device can also be used for actuating an electric automobile contact similar to that described in FIGURE 5, with the four positions $P_1$ to $P_4$, according to the arrow 188.

While there is shown and described present preferred embodiments of the invention it is to be distinctly understood that the invention is not limited thereto but may be otherwise variously embodied and practised within the scope of the following claims.

What is claimed is:
1. Frontal type lock comprising, in combination, a front plate having a key hole for receiving a key, a plurality of individual locking elements capable of being simultaneously and parallely displaced and arranged from an original position into a predetermined position by a key insertable frontally into the lock, individual counter springs against the action of which said individual locking elements are displaced, a collective locking element cooperating with said individual locking elements, a collective counter spring for actuating said collective locking element when said individual locking elements are displaced into said predetermined position corresponding to opening of the lock, said individual locking elements comprising lamellae arranged in package form and bearing substantially flushly against said front plate, each of said lamellae being provided at its surface with projection means extending into said key hole of said front plate for direct contact by the key, and means within said lock for displacing said collective locking element against the force of said collective spring to enable the individual lamellae to assume their original position out of engagement with said collective locking element during such time as the frontal type lock is being opened, thereby protecting the secret of the frontal type lock.

2. Frontal type lock as defined in claim 1 wherein each individual counter spring is connected with its associated lamella.

3. Frontal type lock as defined in claim 1 wherein said collective locking element is provided with recess means for piercingly receiving said package of lamellae, said collective locking element being arranged at substantially right angles to the direction of displacement of said lamellae.

4. Frontal type lock as defined in claim 1 wherein each lamella possesses an edge bearing against an inner surface of said front plate, an edge bearing against said collective locking element, and a projection extending into said key hole of said front plate.

5. Frontal type lock as defined in claim 1, wherein said displacing means for said collective locking element incorporates cam means.

6. Frontal type lock comprising, in combination, a front plate having a key hole for receiving a key, a plurality of individual locking elements capable of being simultaneously and parallelly displaced and arranged by a key insertable frontally into the lock, individual counter springs against the action of which said individual locking elements are displaced, a collective locking element cooperating with said individual locking elements, a collective counter spring for actuating said collective locking element when said individual locking elements are displaced into a predetermined position corresponding to opening of the lock, said individual locking elements comprising lamellae arranged in package form and bearing substantially flushly against said front plate, each of said lamellae being provided at its surface with projection means extending into said key hole of said front plate, said front plate comprising a cap member, a pawl member cooperating with said collective locking element, and a crosstie rod cooperating with said pawl member, said cap member being retained in its locked position when the lock is closed by said pawl member which is then engaging with said crosstie rod.

7. Frontal type lock as defined in claim 6 including lever means, spring means for positively coupling said lever means with said pawl member, and a pin member for form-locking connection of said lever means with said pawl member so that a rigid connection is only provided in one direction.

8. Frontal type lock comprising, in combination, a front plate having a key hole for receiving a key, a plurality of individual locking elements capable of being simultaneously and parallely displaced and arranged by a key insertable frontally into the lock, individual counter springs against the action of which said individual locking elements are displaced, a collective locking element cooperating with said individual locking elements, said collective locking element being U-shaped and incorporating a pair of free legs provided with recess means through which said package of lamellae are displaceable, a collective counter spring for actuating said collective locking element when said individual locking elements are displaced into a predetermined position corresponding to opening of the lock, said individual locking elements comprising lamellae arranged in package form and bearing substantially flushly against said front plate, each of said lamellae being provided at its surface with projection means extending into said key hole of said front plate.

9. Frontal type lock comprising, in combination, a front plate having a key hole for receiving a key, a plurality of individual locking elements capable of being simultaneously and parallely displaced from an original position into a predetermined position by a key insertable frontally into the lock, individual counter springs against the action of which said individual locking elements are displaced, a collective locking element cooperating with said individual locking elements, a collective counter spring for actuating said collective locking element when said individual locking elements are displaced into said predetermined position corresponding to opening of the lock, said individual locking elements comprising lamellae arranged in package form and bearing substantially flushly against said front plate, each of said lamellae being provided at its surface with projection means extending into said key hole of said front plate for direct contact by a key, said lamellae being provided with spaced grooves having teeth means therebetween, said collective locking element being provided with recess means for receiving said teeth means, said teeth means protruding slightly with respect to the respective edge of each of said lamellae, only given lamellae of said package exhibiting grooves having a larger width than necessary for the penetration of said collective locking element to render possible the use of individual keys and pass keys, and means within said lock for displacing said collective locking element against the force of said collective spring to enable the individual lamellae to assume their original position out of engagement with said collective locking element during such time as the frontal lock is being opened, to thereby protect the secret of the frontal type lock.

10. Frontal type lock comprising, in combination, a front plate having a key hole for receiving a key, said front plate being defined by a cylinder cap, a plurality of individual locking elements capable of being simultaneously and parallely displaced and arranged from an original position into a predetermined position by a key insertable frontally into the lock, individual counter springs against the action of which said individual locking elements are displaced, a collective locking element cooperating with said individual locking elements, lever means cooperating with said collective locking element, a collective counter spring for actuating said collective locking element when said individual locking elements are displaced into said predetermined position corresponding to opening of the lock, said individual locking elements comprising lamellae arranged in package form and bearing substantially flushly against said front plate, each of said lamellae being provided at its surface with projection means extending into said key hole of said front plate for direct contact by the key, said lamellae, said collective locking element and said lever means being disposed beneath said cylinder cap, means mounting said cylinder cap for parallel movement relative to the direction of displacement of said lamellae during opening and closing of said lock, and means for displacing said collective locking element against the force of said collective spring to enable the individual lamellae to assume their original position out of engagement with said collective locking element, thereby protecting the secret of the frontal type lock.

11. Frontal type lock comprising, in combination, a front plate having a key hole for receiving a key, a plurality of individual locking elements capable of being simultaneously and parallely displaced and arranged from an original position into a predetermined position by a key insertable frontally into the lock, individual counter springs against the action of which said individual locking elements are displaced, a collective locking element cooperating with said individual locking elements, a collective counter spring for actuating said collective locking element when said individual locking elements are displaced into said predetermined position corresponding to opening of the lock, said individual locking elements comprising lamellae arranged in package form and bearing substantially flushly against said front plate, each of said lamellae being provided at its surface with projection means extending into said key hole of said front plate for direct contact by the key, means for displacing said collective locking element against the force of said collective spring to enable the individual lamellae to assume their original position out of engagement with said collective locking element, thereby protecting the secret of the frontal type lock, a clamping spring having a coupling nose, a rotary knob provided with spaced recesses, said clamping spring engaging via said coupling nose in said spaced recesses and being positively connected with respect to said rotary knob.

12. Frontal type lock comprising, in combination, a front plate having a key hole for receiving a key, a plurality of individual locking elements capable of being simultaneously and parallely displaced and arranged from an original position into a predetermined position by a key insertable frontally into the lock, individual counter springs against the action of which said individual locking elements are displaced, a collective locking element cooperating with said individual locking elements, said collective locking element being U-shaped and provided with an extension constructed as a push button knob serving for closing the lock, a collective counter spring for actuating said collective locking element when said individual locking elements are displaced into said predetermined position corresponding to opening of the lock, said individual locking elements comprising lamellae arranged in package form and bearing substantially flushly against said front plate, each of said lamellae being provided at its surface with projection means extending into said key hole of said front plate for direct contact by the key, and means for displacing said collective locking element against the force of said collective spring to enable the individual lamellae to assume their original position out of engagement with said collective locking element, thereby protecting the secret of the frontal type lock.

13. Frontal type lock comprising, in combination, a front plate having a key hole for receiving a key, a plurality of individual locking elements capable of being simultaneously and parallely displaced and arranged from an original position into a predetermined position by a key insertable frontally into the lock, individual counter springs against the action of which said individual locking elements are displaced, a collective locking element cooperating with said individual locking elements, said collective locking element being U-shaped and incorporating a pair of free legs of different length, a laterally arranged shaft, the longer length free leg serving to lock said shaft, a collective counter spring for actuating said collective locking element when said individual locking elements are displaced into said predetermined position corresponding to opening of the lock, said individual locking elements comprising lamellae arranged in package form and bearing substantially flushly against said front plate, each of said lamellae being provided at its surface with projection means extending into said key hole of said front plate for direct contact by the key, and means for displacing said collective locking element against the force of said collective spring to enable the individual lamellae to assume their original position out of engagement with said collective locking element, thereby protecting the secret of the frontal type lock.

14. Frontal type lock comprising, in combination, a front plate having a key hole for receiving a key, a plurality of individual locking elements capable of being simultaneously and parallely displaced and arranged from an original position into a predetermined position by a key insertable frontally into the lock, individual counter springs against the action of which said individual locking elements are displaced, a collective locking element cooperating with said individual locking elements, said collective locking element being U-shaped and incorporating at least one free leg, a ring member arranged concentrically of said lock, said free leg serving to lock said concentric arranged ring member, a collective counter spring for actuating said collective locking element when said individual locking elements are displaced into said predetermined position corresponding to opening of the lock, said individual locking elements comprising lamellae arranged in package form and bearing substantially flushly against said front plate, each of said lamellae being provided at its surface with projection means extending into said key hole of said front plate for direct contact by the key, and means for displacing said collective locking element against the force of said collective spring to enable the individual lamellae to assume their original position out of engagement with said collective locking element, thereby protecting the secret of the frontal type lock.

References Cited

UNITED STATES PATENTS

| | | | |
|---|---|---|---|
| 19,628 | 3/1858 | Denney | 70—352 |
| 22,425 | 12/1858 | Hiatt | 70—387 X |
| 191,195 | 5/1877 | Thompson | 70—387 X |
| 340,319 | 4/1886 | Jackson | 70—387 X |
| 2,460,551 | 2/1949 | Swanson | 70—376 X |

FOREIGN PATENTS 37,253    2/1913    Sweden.

MARVIN A. CHAMPION, *Primary Examiner.*

EDWARD C. ALLEN, BOBBY R. GAY, *Examiners.*

P. TEITELBAUM, *Assistant Examiner.*